United States Patent
Lee et al.

(10) Patent No.: US 12,166,240 B2
(45) Date of Patent: Dec. 10, 2024

(54) BATTERY MODULE AND BATTERY PACK INCLUDING THE SAME

(71) Applicant: LG Chem, Ltd., Seoul (KR)

(72) Inventors: Youngho Lee, Daejeon (KR); Junyeob Seong, Daejeon (KR); Soo Youl Kim, Daejeon (KR); Gwan Woo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 963 days.

(21) Appl. No.: 17/264,613

(22) PCT Filed: Jun. 22, 2020

(86) PCT No.: PCT/KR2020/008070
§ 371 (c)(1),
(2) Date: Jan. 29, 2021

(87) PCT Pub. No.: WO2021/002619
PCT Pub. Date: Jan. 7, 2021

(65) Prior Publication Data
US 2021/0296738 A1    Sep. 23, 2021

(30) Foreign Application Priority Data
Jul. 1, 2019    (KR) ........................ 10-2019-0078783

(51) Int. Cl.
*H01M 50/503*    (2021.01)
*H01M 50/204*    (2021.01)
(Continued)

(52) U.S. Cl.
CPC ....... *H01M 50/503* (2021.01); *H01M 50/204* (2021.01); *H01M 50/262* (2021.01); *H01M 50/507* (2021.01)

(58) Field of Classification Search
CPC ............. H01M 50/503; H01M 50/262; H01M 50/507; H01M 50/204; H01M 50/50–512; H01M 50/517
See application file for complete search history.

(56) References Cited

U.S. PATENT DOCUMENTS

| 7,611,798 B2 | 11/2009 | Yoon et al. |
| 9,978,998 B2 | 5/2018 | Choi et al. |
| (Continued) | | |

FOREIGN PATENT DOCUMENTS

| CN | 205790151 U | 12/2016 |
| CN | 107710450 A | 2/2018 |
| (Continued) | | |

OTHER PUBLICATIONS

Search Report and Written Opinion for PCT/KR2020/008070 dated Sep. 28, 2020, 10 pages.

(Continued)

*Primary Examiner* — James Lee
(74) *Attorney, Agent, or Firm* — Lerner David LLP (57) ABSTRACT

A battery module with improved space utilization of a secondary battery includes a battery cell stack in which a plurality of battery cells are stacked; a busbar frame formed on a front surface or a rear surfaces of the battery cell stack; a terminal busbar formed outside the busbar frame based on the battery cell stack to be electrically connected to an external power source; and an end plate covering the busbar frame, wherein the terminal busbar is formed is formed to have a recessed side surface, and a nut is inserted into a space formed by the recessed side surface and the busbar frame. A battery pack including the battery module is also provided.

14 Claims, 7 Drawing Sheets

(51) Int. Cl.
H01M 50/262 (2021.01)
H01M 50/507 (2021.01)

(56) References Cited

U.S. PATENT DOCUMENTS

| | | |
|---|---|---|
| 2016/0036028 A1 | 2/2016 | Tsuruta et al. |
| 2018/0159096 A1 | 6/2018 | Kim et al. |
| 2019/0157638 A1 | 5/2019 | Jung et al. |
| 2019/0348720 A1 | 11/2019 | Oh et al. |
| 2019/0366875 A1 | 12/2019 | Hong et al. |
| 2019/0389318 A1 | 12/2019 | Lee et al. |
| 2020/0014005 A1 | 1/2020 | Lee et al. |
| 2020/0144580 A1 | 5/2020 | Hong et al. |
| 2020/0176745 A1 | 6/2020 | Lee |
| 2020/0321589 A1 | 10/2020 | Watahiki et al. |

FOREIGN PATENT DOCUMENTS

| | | |
|---|---|---|
| CN | 109950448 A | 6/2019 |
| CN | 208955358 U | 6/2019 |
| EP | 3671903 A1 | 6/2020 |
| JP | 2006120489 A | 5/2006 |
| JP | 2018110082 A | 7/2018 |
| JP | 2019029175 A | 2/2019 |
| KR | 20070043501 A | 4/2007 |
| KR | 100821859 B1 | 4/2008 |
| KR | 20170011349 A | 2/2017 |
| KR | 20170054878 A | 5/2017 |
| KR | 101807115 B1 | 12/2017 |
| KR | 20190005403 A | 1/2019 |
| KR | 20190027096 A | 3/2019 |
| KR | 20190054709 A | 5/2019 |
| KR | 20190071454 A | 6/2019 |
| WO | 2017078264 A1 | 5/2017 |
| WO | 2019069837 A1 | 4/2019 |
| WO | 2019124876 A1 | 6/2019 |

OTHER PUBLICATIONS

Search Report dated Aug. 25, 2022 from the Office Action for Chinese Application No. 202080004526.0 issued Sep. 2, 2022, pp. 1-3. [See p. 1, categorizing the cited references].

Supplemental Report for European Application No. 20834408.5 dated Sep. 21, 2021. 2 pgs.

PRIOR ART

FIG. 7

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008070, filed Jun. 22, 2020, published in Korean, which claims the benefit of Korean Patent Application No. 10-2019-0078783 filed on Jul. 1, 2019 with the Korean Intellectual Property Office, the disclosures of which are incorporated herein by reference in their entireties.

TECHNICAL FIELD

The present disclosure relates to a battery module and a battery pack including the same, and more particularly, to a battery module with improved space utilization of a secondary battery, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery module includes a battery cell stack in which a plurality of battery cells are stacked, a busbar frame formed at each of both ends of the battery cell stack, a terminal busbar formed in the busbar frame, an end plate formed outside the busbar frame, an insulating cover formed inside the end plate, and a nut that connects a power source, a busbar connected to other modules, or a high voltage cable to the terminal busbar.

Figure 1:
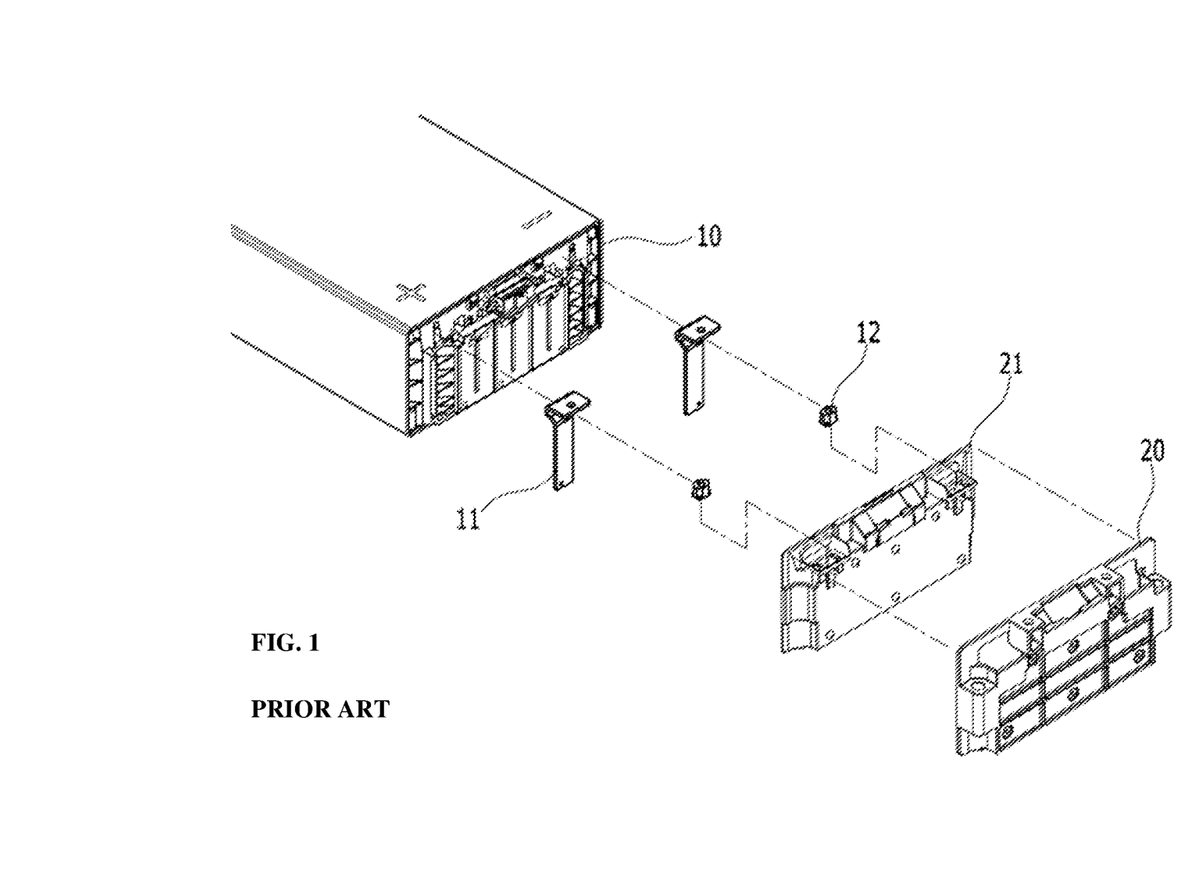
FIG. 1 is an exploded perspective view showing an installation position of a busbar frame, a terminal busbar, a nut, an insulating cover and an end plate in a conventional battery module.
Figure 2:
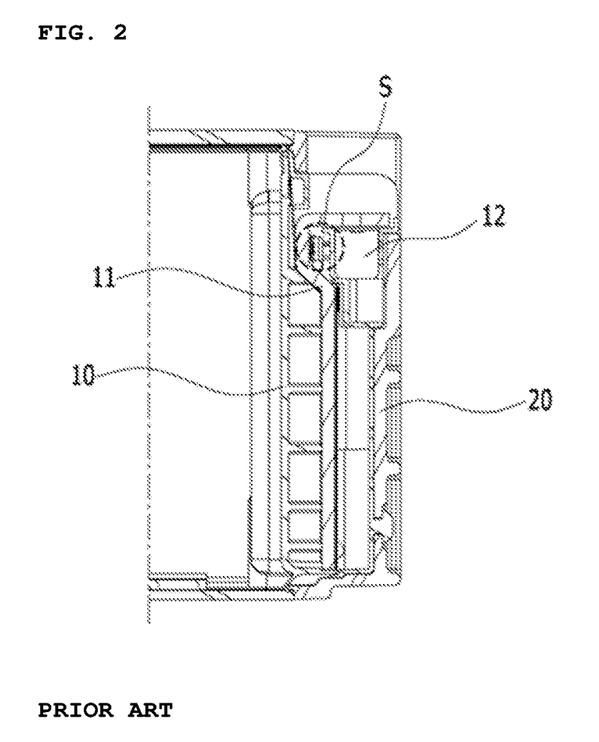
FIG. 2 is a cross-sectional view showing a state in which the components of FIG. 1 are assembled.

FIG. 1 is an exploded perspective view showing an assembly direction of a busbar frame, a terminal busbar, a nut, an insulating cover and an end plate in a conventional battery module. FIG. 2 is a cross-sectional view showing a state in which the components of FIG. 1 are assembled.

Referring to FIG. 1, conventionally, it was formed in a structure in which a busbar frame 10 is installed outside a battery cell stack; a terminal busbar 11 is installed outside the busbar frame 10, respectively; a nut 12 is installed outside the terminal busbar 11; and an insulating cover 21 and an end plate 20 are sequentially installed outside the nut 12 in a longitudinal direction of the battery module.

However, since there is a risk that the nut 12 may be separated from the battery module, a nut insertion structure was separately manufactured on the end plate 20 and the nut 12 had to be inserted therein, as shown. In this case, there is a problem that the shape of the nut 12 is also inevitably formed in a slightly complicated manner so that it can be fitted into the nut insertion structure.

In addition, referring to FIG. 2, since an upper end of the terminal busbar 11 in the battery module is formed to be bent, and the nut 12 is formed on the right side of the bent part of the terminal busbar 11, an empty space S is formed between the nut 12 and the upper end of the busbar 11. No other electrical equipment is installed in the empty space S, and therefore, there is a need to utilize the space S by changing the arrangement of components.

DETAILED DESCRIPTION OF THE INVENTION

Technical Problem

The present disclosure has been made to solve the above-mentioned problems, and an object of the present disclosure is to provide a battery module having more compact and simple nut-fixing structure, and a battery pack including the same.

Another object of the present disclosure is to provide a battery module having an optimized arrangement of components and a more compact structure by efficiently utilizing the remaining space in the battery module, and a battery pack including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In order to realize the above object, one embodiment of the present disclosure provides a battery module and a battery pack including the same are provided, the battery module comprising: a battery cell stack in which a plurality of battery cells are stacked; a busbar frame formed on a front surface or a rear surface of the battery cell stack; a terminal busbar formed outside the busbar frame based on the battery cell stack to be electrically connected to an external power source; and an end plate covering the busbar frame, wherein the terminal busbar is formed to have a recessed side surface, and a nut is inserted into a space formed by the recessed side surface and the busbar frame.

The terminal busbar may comprise: a body part coupled to the busbar frame; a protrusion part formed on an upper side of the body part to protrude outward while being perpendicular to the busbar frame; and a bent part formed to be bent while connecting the body part and the protrusion part, wherein a side surface of the bent part may be formed to be recessed.

The protrusion part may be formed to cover an upper side of the nut.

A hole part may be formed at one side of the protrusion part, and the hole part may be formed at a position corresponding to a hollow part of the nut.

The end plate may be formed outside the terminal busbar and the nut based on a lengthwise direction of the battery cell stack to cover the busbar frame.

The end plate may further include an insulating cover formed between the terminal busbar and the end plate and between the nut and the end plate.

The nut may be formed in a cube shape.

The nut may also be formed in a rectangular parallelepiped shape.

The terminal busbar includes two terminal busbars respectively formed on opposing sides of the busbar frame, the two terminal busbars are formed such that the opposite side surfaces are respectively recessed, and the nut includes two nuts respectively inserted into the spaces.

A plurality of busbars may be formed between the two terminal busbars, two busbar frame protrusion parts each covering at least one of the plurality of busbars from a side surface may be formed in the busbar frame, and the two busbar frame protrusion parts may respectively support opposite portions of the two nuts.

Advantageous Effects

The battery module and the battery pack including the same according to one embodiment of the present disclosure are configured such that the side surface of a terminal busbar is formed to be recessed, and a nut is inserted and installed in a space formed by the recessed portion and the busbar frame, whereby the nut can be supported and fixed only with an existing busbar structure without a separate nut-fixing structure. In addition, a size of the nut can be minimized, and a shape of the nut can be simplified, thereby exhibiting the advantage of reducing the cost when producing the nuts.

In addition, the battery module and the battery pack including the same according to one embodiment of the present disclosure are configured such that a space is created on the side surface of the bent part of the conventional terminal busbar and a nut is inserted into the space, thereby optimizing the arrangement of components, and further, a terminal busbar and a nut are located side by side in a width direction of the battery module to reduce the length of the battery module as a whole, thereby providing an effect of increasing an energy density relative to a volume of the battery module.

The effects of the present disclosure are not limited to the above-mentioned effects, and other effects not mentioned will be clearly understood by those skilled in the art from the description of the claims.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present disclosure will be described with reference to FIG. 3 to FIG. 7.

Figure 3:
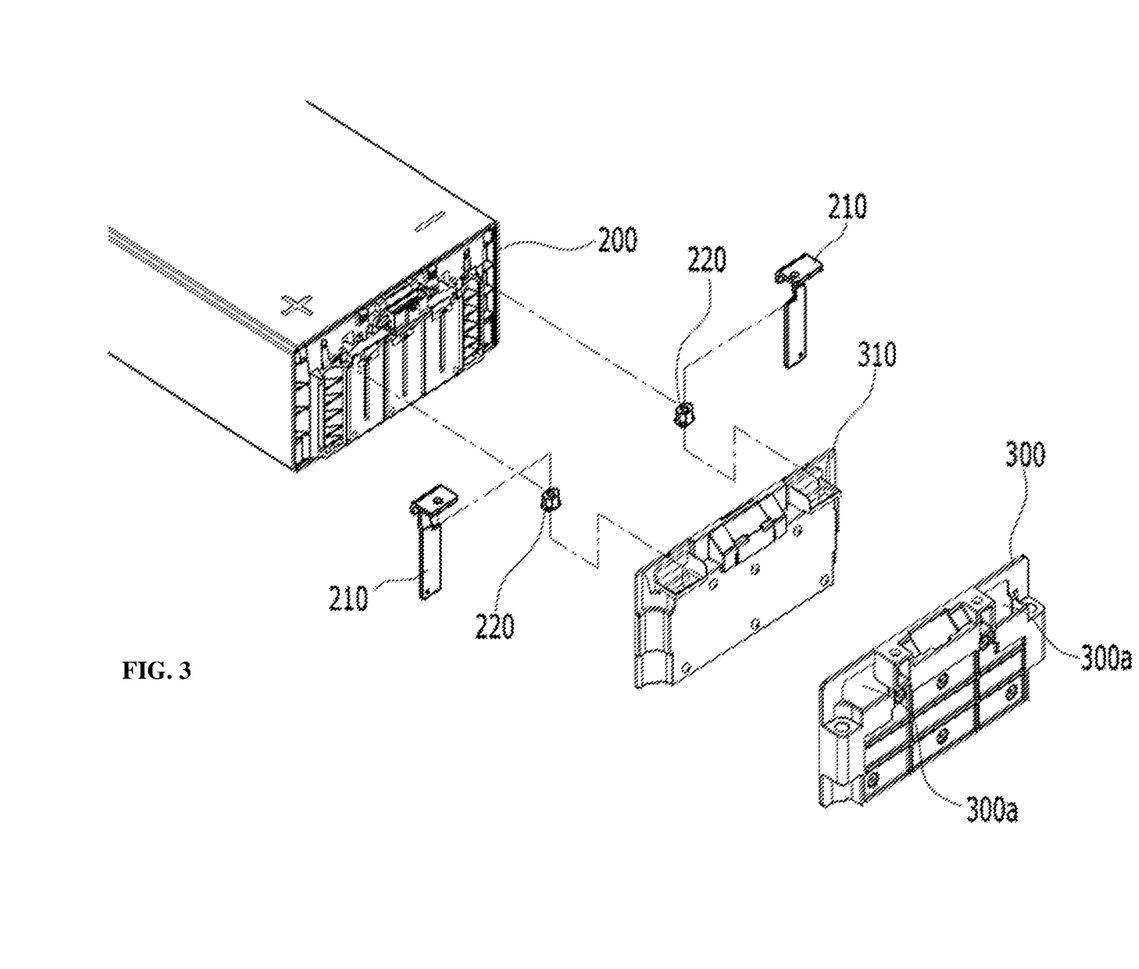
FIG. 3 is an exploded perspective view showing an installation position of a busbar frame, a terminal busbar, a nut, an insulating cover and an end plate according to one embodiment of the present disclosure.
Figure 4:
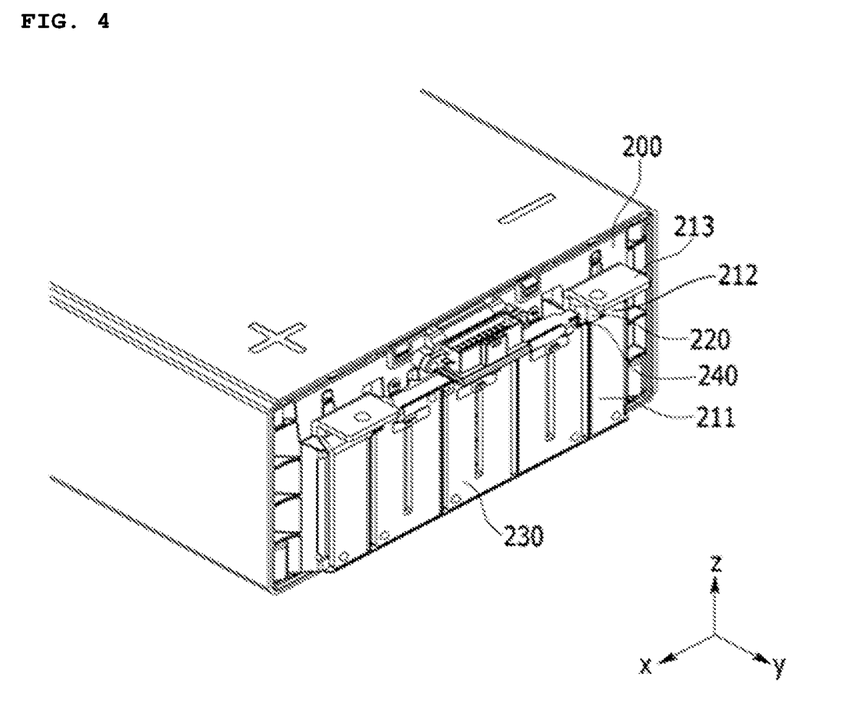
FIG. 4 is a perspective view showing a terminal busbar, a nut and a peripheral configuration according to one embodiment of the present disclosure.
Figure 5:
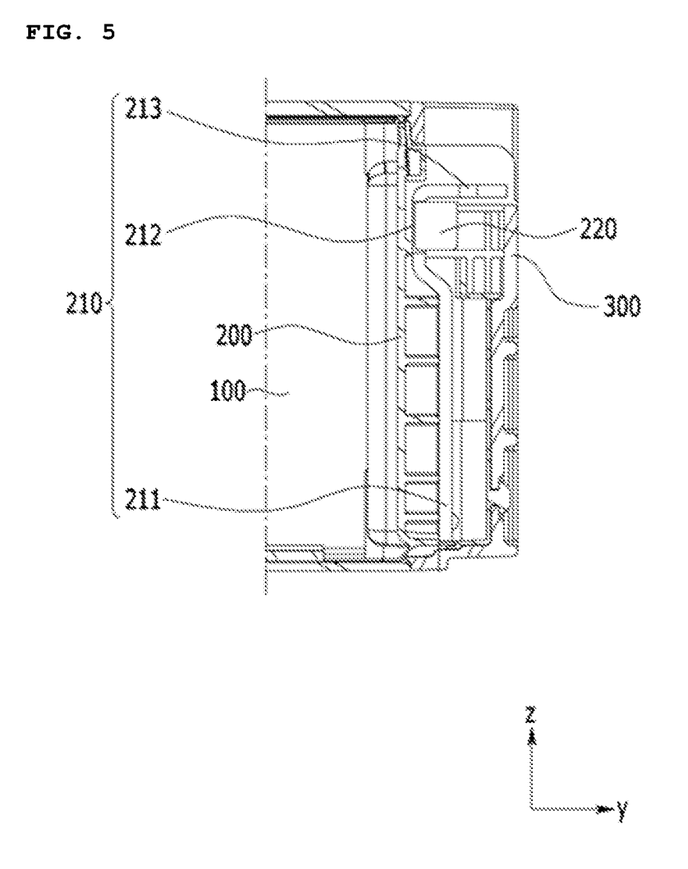
FIG. 5 is a cross-sectional view showing a terminal busbar, a nut and a peripheral configuration according to one embodiment of the present disclosure.
Figure 6:
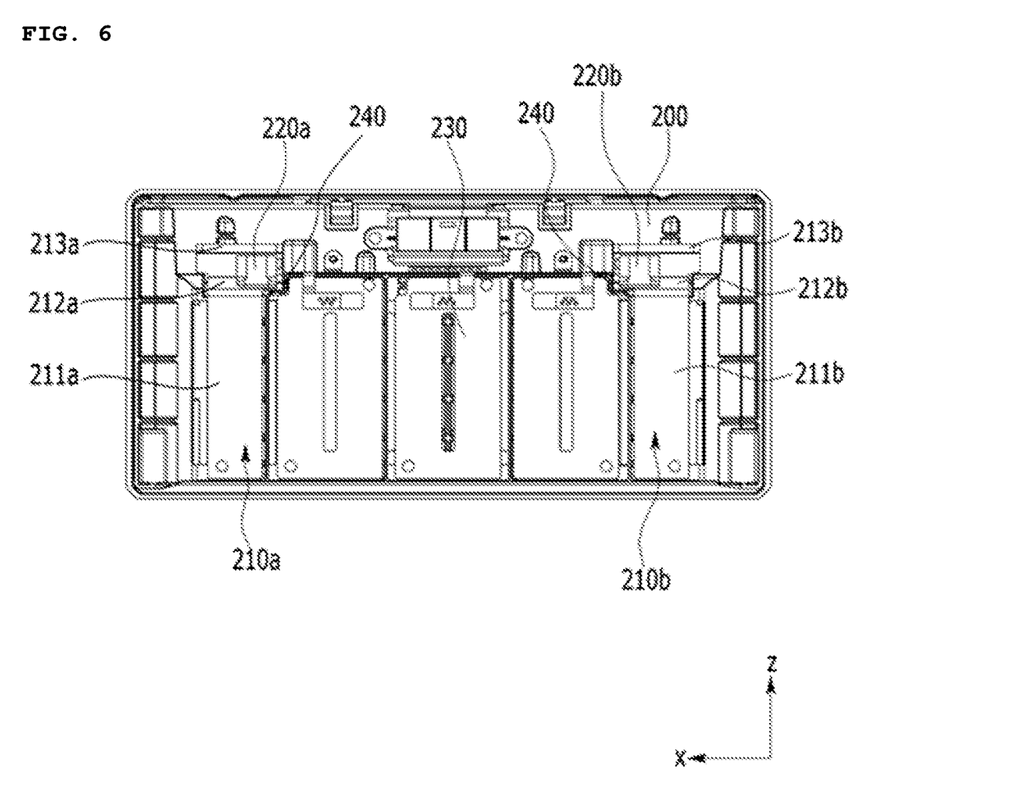
FIG. 6 is a front view showing a terminal busbar, a nut and a peripheral configuration according to one embodiment of the present disclosure.
Figure 7:
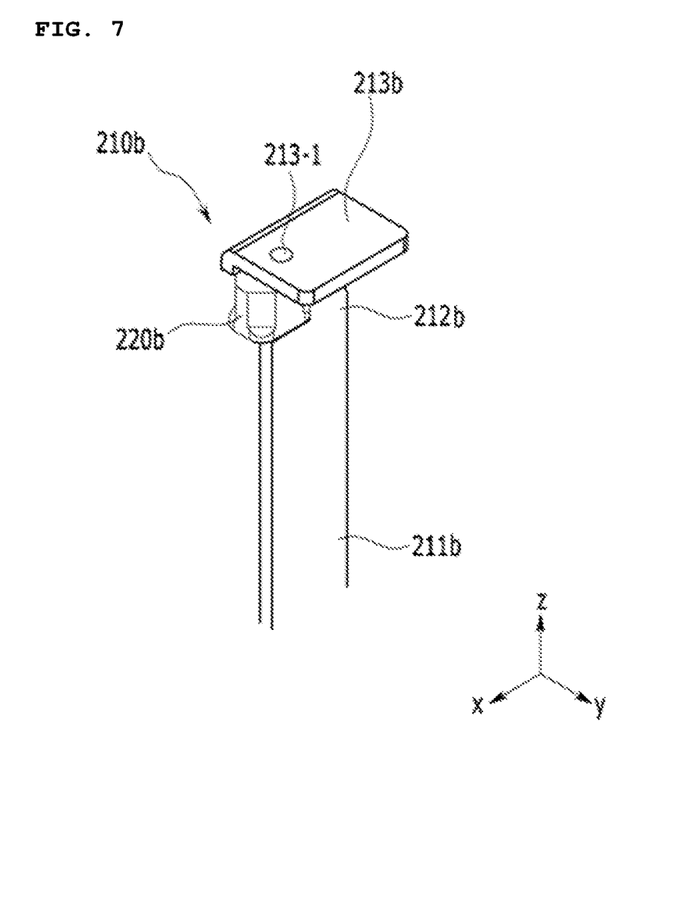
FIG. 7 is a view showing one terminal busbar and a nut according to one embodiment of the present disclosure.

FIG. 3 is an exploded perspective view showing an installation position of a busbar frame, a terminal busbar, a nut, an insulating cover and an end plate according to one embodiment of the present disclosure. FIG. 4 is a perspective view showing a terminal busbar, a nut and a peripheral configuration according to one embodiment of the present disclosure. FIG. 5 is a cross-sectional view showing a terminal busbar, a nut and a peripheral configuration according to one embodiment of the present disclosure. FIG. 6 is a front view showing a terminal busbar, a nut and a peripheral configuration according to one embodiment of the present disclosure. FIG. 7 is a view showing one terminal busbar and a nut according to one embodiment of the present disclosure.

Referring to FIG. 3 to FIG. 7, a battery module according to one embodiment of the present disclosure comprises: a battery cell stack in which a plurality of battery cells 100 are stacked, a busbar frame 200 formed on the front and rear surfaces of the battery cell stack, a terminal busbar 210 formed outside the busbar frame 200 based on the battery cell stack to be electrically connected to an external power source, a nut 220 connecting an external power source, a busbar connected to other modules, or a high voltage cable to the terminal busbar 210, wherein the terminal busbar 210 is formed is formed to have a recessed side surface, and the nut 220 is formed to be inserted into a space formed by the recessed side surface of the terminal busbar 210 and the busbar frame.

The battery cell 100 is a secondary battery, and may be configured by a pouch-type secondary battery. The battery cells 100 may be composed of a plurality of cells, and the plurality of battery cells 100 may be stacked together so as to be electrically connected to each other to form a battery cell stack. Each of the plurality of battery cells may include an electrode assembly, a battery case, and an electrode lead (not shown) protruding from the electrode assembly.

The busbar frame 200 is formed on each of the front and rear surfaces of the battery cell stack. The busbar frame 200 may be formed to cover the front and rear surfaces of the battery cell stack so as to electrically connect the electrode leads of the plurality of battery cells 100.

The terminal busbar 210 is formed outside the busbar frame 200 based on the battery cell stack. The terminal busbar 210 is formed on each of both sides of the busbar frame 200 to electrically connect an external power source to the busbar frame 200 connected to the battery cell 100.

The end plate 300 may be formed outside the terminal busbar 210 and the nut 220 based on the lengthwise direction of the battery cell stack to cover the busbar frame 200. The end plate 300 protects the busbar frame 200 and various electrical equipment connected thereto from external impact, has a battery module mounting structure as a component of the frame, and at the same time allows the terminal busbar 210 and the nut 220 to protrude outward through an opening part 300a formed in the end plate 300, thereby guiding an electrical connection between the busbar frame 200 and an external power source.

The insulating cover 310 may be formed between the terminal busbar 210 and the end plate 300 and between the nut 220 and the end plate 300 to block an unnecessary electrical connection between the busbar frame 200 and the outside.

The terminal busbar 210 may include a body part 211, a protrusion part 213 formed on an upper side of the body part 211 to protrude outward while being perpendicular to the busbar frame 200, and a bent part 212 formed to be bent while connecting the body part 211 and the protrusion part 213.

The body part 211 may be formed in a vertical plate shape to be coupled to the busbar frame 200. Through this, an electric signal transmitted from the battery cell 100 may be transmitted to the protrusion part 213.

The protrusion part 213 may be formed to protrude to the outside through an opening part 300a of the end plate to be electrically connected to an external power source. A hole part 213-1 is formed at one side of the protrusion part 213, and a hollow part of the nut 220 penetrates through the hole part 213-1, so that a bolt may be inserted into the through space to couple the nut 220 and the terminal busbar 210.

The bent part 212 is formed such that the side surface is recessed, and the nut 220 may be inserted and located in a space formed by the recessed portion of the bent part 212 and the frame surface of the busbar frame 200 located inside.

Conventionally, since a nut was located outside the terminal busbar, a nut insertion structure for fixing and supporting the nut had to be separately provided on the end plate, and a shape of the nut was also slightly complicated and had to be made relatively large. According to one embodiment of the present disclosure, the side surface of the bent part 212 is formed to be recessed, a nut 220 is formed to be inserted into a space formed in the recessed portion, and the nut 220 is fixed and supported by the busbar frame 200, the terminal busbar 210, and a busbar frame protrusion part 240 and an end plate 300 which will be described later, whereby there is no need to provide a separate nut insertion structure in the end plate. In addition, the nut 220 can be manufactured in a simple shape, and according to one embodiment of the present disclosure, the nut 220 can be formed in a simple structure of a cube shape. In addition, the nut 220 may also be formed in a structure of a rectangular parallelepiped shape. If it is formed in a rectangular parallelepiped shape, the size of the nut can be further reduced.

In addition, conventionally, since the nut was located outside the bent part, separately from the space formed by the bent part of the terminal busbar, there was a disadvantage that the length of the battery module may be increased by the sum of a space formed by the bent part and a space occupied by the nut. According to one embodiment of the present disclosure, however, since the nut 220 can be inserted into the recessed space of the side surface formed by the bent part 212, the length of the battery module can be reduced as much as the space for forming the conventional bent part.

According to the simulation results, a ratio of the length of the battery cell to the total length of the conventional battery module occupied about 93.04%, whereas a ratio of the length of the battery cell to the total length of the battery module according to one embodiment of the present disclosure occupies 94.48%, and thus, it is now possible to design the length of the battery module to be reduced compared to the length of the battery cell. As the length of the battery module can be reduced through the optimized arrangement of components as described above, an energy density relative to the volume of the battery module can be increased.

The terminal busbar 210 may be formed on each of both sides of the busbar frame 200. Referring to FIG. 6, the terminal busbars 210a and 210b may be formed of a left terminal busbar 210a and a right terminal busbar 210b.

The left terminal busbar 210a may include a body part 211a, a protrusion part 213a formed on an upper side of the body part 211a to protrude outward while being perpendicular to the busbar frame 200, and a bent part 212a formed to be bent while connecting the body part 211a and the protrusion part 213a.

The right terminal busbar 210b may include a body part 211b, a protrusion part 213b formed on an upper side of the body part 211b to protrude outward while being perpendicular to the busbar frame 200, and a bent part 212b formed to be bent while connecting the body part 211b and the protrusion part 213b.

FIG. 7 shows in more detail a structure of the right terminal busbar 210b. The left terminal busbar 210a is formed in a structure symmetrical with the right terminal busbar 210b, and thus, a structure of the left terminal busbar 210a can be grasped through a structure of the right terminal busbar 210b.

Referring to FIG. 6 for the position and fixing structure of the nut, the terminal busbars 210a and 210b are formed on both sides of the busbar frame 200, respectively, and the opposite side surfaces of the terminal busbars 210a and 210b may be formed to be recessed, respectively. Accordingly, two nuts 220a and 220b may be located on opposite side surfaces of the two terminal busbars 210a and 210b, respectively.

More specifically, a portion in the x-axis direction of the bent part 212a of the left terminal busbar 210a may be formed to be recessed, and a nut 220a may be inserted into the recessed portion. In addition, a portion in the x-axis direction of the bent part 212b of the right terminal busbar 210b may be formed to b recessed, and a nut 220b may be inserted into the recessed portion.

The two terminal busbars 210a and 210b may have the same shape and may be formed symmetrically to each other. The shapes of the two nuts 220a and 220b may be formed in the same way to cope with this.

A plurality of busbars 230 coupled to the busbar frame 200 may be formed between the terminal busbars 210a and 210b on both sides. In addition, the busbar frame 200 may have a busbar frame protrusion part 240 formed to be protruded from the busbar frame 200 to cover side surfaces of the plurality of busbars 230.

Among the busbar frame protrusion parts 240, the outermost protrusion parts adjacent to each of the two terminal busbars 210a and 210b may be formed to support opposite portions of the two nuts 220a and 220b, respectively, which are located so as to face a space formed to be recessed on the opposite side surfaces of the terminal busbars 210a and 210b.

More specifically, the nut 220a inserted into the recessed space of the left terminal busbar 210a may be supported on the right side of the nut 220a through the busbar frame protrusion part 240 formed on the right side of the nut 220a, and the nut 220b inserted into the recessed space of the right terminal busbar 210b may be supported on the left side of the nut 220b through the busbar frame protrusion part 240 formed on the left side of the nut 220b.

As a result, the nut 220a located on the left side may be supported and fixed through the busbar frame 200 supporting the nut 220a in the y-axis direction based on the nut 220a, the protrusion part 213a fixing an upper side of the nut 220a in the z-axis direction, the bent part 212a supporting the nut 220a in the x-axis direction and z-axis direction, the busbar frame protrusion part 240 supporting the nut 220a in the x-axis direction and z-axis direction, by using existing components in the xyz-axis direction of the nut 220a except for the direction (y-axis direction) connected to an external electric equipment.

Similarly, the nut 220b located on the right side may be supported and fixed through the busbar frame 200 supporting the nut 220b in the y-axis direction based on the nut 220b, the protrusion part 213b fixing an upper side of the nut 220b in the z-axis direction, the bent part 212b supporting the nut 220b in the x-axis direction and z-axis direction, the busbar frame protrusion part 240 supporting the nut 220b in the x-axis direction and z-axis direction, by using existing components in the xyz-axis direction of the nut 220b except for the direction (y-axis direction) connected to an external electric equipment.

The battery module as described above may be included in a battery pack. The battery pack may have a structure in which one or more of the battery modules according to the present embodiment are gathered, and packed together with a battery management system (BMS) and a cooling device that control and manage battery's temperature, voltage, etc.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
200: busbar frame
210: terminal busbar
211: protrusion part
211-1: hole part
212: bent part
213: body part
220: nut
230: busbar
240: busbar frame protrusion part
300: end plate
300a: opening part
310: insulating cover

The invention claimed is:

1. A battery module comprising:
a battery cell stack in which a plurality of battery cells are stacked in a stacking direction;
a busbar frame formed on a front surface or a rear surface of the battery cell stack;
a terminal busbar formed outside the busbar frame based on the battery cell stack to be electrically connected to an external power source, wherein a side surface of the terminal busbar includes a recess extending into the side surface in the stacking direction; and
an end plate covering the busbar frame,
wherein a nut is at least partially received within the recess.

2. The battery module of claim 1, wherein the terminal busbar comprises:
a body part coupled to the busbar frame;
a protrusion part formed on an upper side of the body part to protrude outward while being perpendicular to the busbar frame; and
a bent part formed to be bent while connecting the body part and the protrusion part,
wherein a side surface of the bent part includes the recess.

3. The battery module of claim 2, wherein the protrusion part is formed to cover an upper side of the nut.

4. The battery module of claim 3, wherein a hole part is formed at one side of the protrusion part, and the hole part is formed at a position corresponding to a hollow part of the nut.

5. The battery module of claim 1, wherein the end plate is formed outside the terminal busbar and the nut based on a lengthwise direction of the battery cell stack to cover the busbar frame.

6. The battery module of claim 5, wherein the end plate further comprises an insulating cover formed between the terminal busbar and the end plate and between the nut and the end plate.

7. The battery module of claim 1, wherein the nut is formed in a cube shape.

8. The battery module of claim 1, wherein the nut is formed in a rectangular parallelepiped shape.

9. The battery module of claim 1, further including a second terminal busbar formed on an opposing sides of the busbar frame from the terminal busbar, wherein a second side surface of the second terminal busbar including a second recess extending into the second side surface in the stacking direction, and the battery module further including a second nut,
wherein the recess and the second recess are disposed to face each other in the stacking direction, and
wherein the nut and the second nut are received within the recess and the second recess, respectively.

10. The battery module of claim 9, wherein a plurality of busbars is formed between the terminal busbar and the second terminal busbar,
wherein the busbar frame includes a busbar frame protrusion part and a second busbar frame protrusion part each being disposed to cover a portion of at least one of the plurality of busbars, and wherein the busbar frame protrusion part and the second busbar frame protrusion part each support a portion of the nut and the second nut facing one another.

11. A battery pack comprising the battery module according to claim 1.

12. The battery module of claim 1,
wherein the nut extends within the recess toward a rear surface of the terminal bus bar in the stacking direction.

13. A battery module comprising:
a battery cell stack in which a plurality of battery cells are stacked in a stacking direction;
a first busbar frame formed on a front surface of the battery cell stack;
a second busbar frame formed on a rear surface of the battery cell stack;
a first terminal busbar, wherein a first side surface of the first terminal busbar includes a first recess extending into the first side surface in the stacking direction, the first terminal busbar being disposed outside the first busbar frame based on the battery cell stack to be electrically connected to an external power source;
a second terminal busbar, wherein a second side surface of the second terminal busbar includes a second recess extending into the second surface in the stacking direction, the second terminal busbar being disposed outside the second busbar frame based on the battery cell stack to be electrically connected to an external power source;
a first end plate covering the first busbar frame;
a second end plate covering the second busbar frame; and
a first nut at least partially received within the first recess; and
a second nut at least partially received within the second recess.

14. The battery module of claim 12,
wherein the nut is disposed within the recess such that there is no portion of the terminal bus bar disposed between the nut and the bus bar frame in the stacking direction.

\* \* \* \* \*